US009089833B2

(12) United States Patent
Ng et al.

(10) Patent No.: US 9,089,833 B2
(45) Date of Patent: Jul. 28, 2015

(54) CALCIUM AND LANTHANUM SOLID BASE CATALYSTS FOR TRANSESTERIFICATION

(75) Inventors: K.Y. Simon Ng, West Bloomfield, MI (US); Shuli Yan, Detroit, MI (US); Steven O. Salley, Grosse Pointe Park, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 736 days.

(21) Appl. No.: 13/127,614

(22) PCT Filed: Nov. 5, 2009

(86) PCT No.: PCT/US2009/063363
§ 371 (c)(1),
(2), (4) Date: May 4, 2011

(87) PCT Pub. No.: WO2010/054054
PCT Pub. Date: May 14, 2010

(65) Prior Publication Data
US 2011/0209388 A1 Sep. 1, 2011

Related U.S. Application Data

(60) Provisional application No. 61/111,508, filed on Nov. 5, 2008.

(51) Int. Cl.
C10L 1/18 (2006.01)
B01J 23/00 (2006.01)
B01J 23/10 (2006.01)
B01D 53/94 (2006.01)
B01J 35/10 (2006.01)
B01J 37/03 (2006.01)
C11C 3/00 (2006.01)

(52) U.S. Cl.
CPC ............... *B01J 23/10* (2013.01); *B01D 53/945* (2013.01); *B01J 35/1014* (2013.01); *B01J 37/031* (2013.01); *C11C 3/003* (2013.01); *Y02T 10/22* (2013.01)

(58) Field of Classification Search
CPC ...... B01J 23/10; B01J 35/1014; B01J 37/031; C11C 3/033; Y02T 10/22; B01D 53/945
USPC ............................................. 44/385; 502/303
See application file for complete search history.

(56) References Cited

U.S. PATENT DOCUMENTS 6,864,213 B2 * 3/2005 LaBarge et al. ............... 502/302
2006/0069274 A1 3/2006 Dias De Moraes E Silva et al.

FOREIGN PATENT DOCUMENTS

CA 2280631 A1 * 2/2000
EP 1707534 A1 10/2006
EP 1884559 A1 2/2008

OTHER PUBLICATIONS

Choudhary V. R. et al., "Surface Properties of CAO (or BAO)-LA2O3-MGO Catalysts and their Performance in Oxidative Coupling of Methane", *Journal of Chemical Technology and Biotechnology*, vol. 69(1), May 1, 1997, pp. 63-69.

(Continued)

*Primary Examiner* — James Goloboy
*Assistant Examiner* — Latosha Hines
(74) *Attorney, Agent, or Firm* — Brinks Gilson and Lione

(57) ABSTRACT

In one aspect, a heterogeneous catalyst comprises calcium hydroxide and lanthanum hydroxide, wherein the catalyst has a specific surface area of more than about 10 m$^2$/g. In another aspect, a heterogeneous catalyst comprises a calcium compound and a lanthanum compound, wherein the catalyst has a specific surface area of more than about 10 m$^2$/g, and a total basicity of about 13.6 mmol/g. In further another aspect, a heterogeneous catalyst comprises calcium oxide and lanthanum oxide, wherein the catalyst has a specific surface area of more than about 10 m$^2$/g. In still another aspect, a process for preparing a catalyst comprises introducing a base precipitant, a neutral precipitant, and an acid precipitant to a solution comprising a first metal ion and a second metal ion to form a precipitate. The process further comprises calcining the precipitate to provide the catalyst.

10 Claims, 10 Drawing Sheets

(56) References Cited

OTHER PUBLICATIONS

Costa C. N. et al., "The Selective Catalytic Reduction of Nitric Oxide with Methane over La2O3-CaO Systems: Synergistic Effects and Surface Reactivity Studies of No, CH4, O2, and Co2 by Transient Techniques", *Journal of Catalysis*, vol. 194(2), Sep. 2000, pp. 250-265.

Yu, L. et al., "Inhibition of gas-phase oxidation of ethylene in the oxidative conversion of methane and ethane over CaO, La2O3/CaO and SrO-La2O3/CaO catalysts", *Applied Catalysis A: General*, Elsevier Science, vol. 175(1-2), Dec. 14, 1998, pp. 173-179.

* cited by examiner

CALCIUM AND LANTHANUM SOLID BASE CATALYSTS FOR TRANSESTERIFICATION

CROSS REFERENCE TO RELATED APPLICATIONS

The present application claims priority to PCT Application No. PCT/US2009/063353, filed Nov. 5, 2009, which application claims the benefit of U.S. Provisional Patent Application No. 61/111,508, filed Nov. 5, 2008, the entirety of which is hereby incorporated by reference.

This invention was made with government support awarded by the Department of Energy (Grant DEFG36-05GO85005). The government has certain rights in the invention.

FIELD

The present disclosure relates to novel catalysts and methods using same for the production of biodiesel through transesterification reactions of raw materials in the presence of an alcohol. More specifically, the present disclosure relates to novel catalysts and methods using same for transesterification processes for biodiesel production using raw materials with relatively high water and free fatty acid contents, such as crude oils.

BACKGROUND

Biodiesel, a renewable fuel with similar combustion properties to fossil diesel, is normally produced by transesterification of highly refined oils with short-chain alcohols. Biodiesel can significantly decrease the exhaust emission of $CO_2$, SQ and unburned hydrocarbons from motor vehicles. Biodiesel is environmentally beneficial, and therefore, is a promising alternative to fossil diesel.

Conventionally, biodiesel is produced by a transesterification process using homogeneous strong base catalysts, such as sodium hydroxide or potassium hydroxide. The strong base catalysts have many advantages such as high activity and mild reaction conditions. However, these homogeneous base catalysts are corrosive, and removal of the catalysts from the biodiesel product is not straight forward. In general, a large amount of waste washing water is generated, and a long time is required for phase separation. The use of solid base catalysts can alleviate these problems and thus, recently highly active solid base catalysts have been developed for biodiesel production.

Some calcium-containing solid base catalysts were reported to be active in oil transesterification with methanol. Several traditional methods have been described for the preparation of the calcium-containing catalysts, such as CaO catalysts supported on mesoporous silica using an impregnation method, solid super bases prepared by dipping CaO in an ammonium carbonate solution, and $CaTiO_3$, $CaMnO_3$, $Ca_2Fe_2O_5$, $CaZrO_3$, and Ca—$CeO_2$ catalysts prepared by a physical mixing method. Solid base catalysts were also prepared using a precipitation method.

BRIEF SUMMARY

In one aspect, a heterogeneous catalyst comprises calcium hydroxide and lanthanum hydroxide, wherein the catalyst has a specific surface area of more than about 10 $m^2$/g.

In another aspect, a heterogeneous catalyst comprises a calcium compound and a lanthanum compound, wherein the catalyst has a specific surface area of more than about 10 $m^2$/g, and a total basicity of about 13.6 mmol/g.

In further another aspect, a heterogeneous catalyst comprises calcium oxide and lanthanum oxide, wherein the catalyst has a specific surface area of more than about 10 $m^2$/g.

In still another aspect, a process for producing a biofuel comprises contacting a feed material that comprises a glyceride with an alcohol in the presence of the catalyst as disclosed in the present disclosure such that at least some of the glyceride in the feed material is converted into the corresponding alcoholic ester of the glyceride.

In yet another aspect, a process for producing a biofuel comprises contacting a feed material that comprises a glyceride and at least one free fatty acid with an alcohol in the presence of the catalyst as disclosed in the present disclosure such that at least some of both the glyceride and the at least one free fatty acid in the feed material are converted into the corresponding alcoholic esters of the glyceride and the free fatty acid, respectively.

In still yet another aspect, a process for preparing a catalyst comprises introducing a base precipitant, a neutral precipitant, and an acid precipitant to a solution comprising a first metal ion and a second metal ion to form a precipitate. The process further comprises calcining the precipitate to provide the catalyst.

In further another aspect, a process of for preparing a catalyst comprises introducing an ammonia solution to a solution comprising calcium and lanthanum ions to form an ammonia metal ion solution, heating the ammonia metal ion solution to boiling, and introducing ethanol to the boiling ammonia metal ion solution to form an ammonia ethanol solution. The process further comprises introducing carbon dioxide to the ammonia ethanol solution to form a precipitate, and calcining the precipitate to form the catalyst.

DETAILED DESCRIPTION OF THE PREFERRED EMBODIMENTS

Definitions

Figure 1:
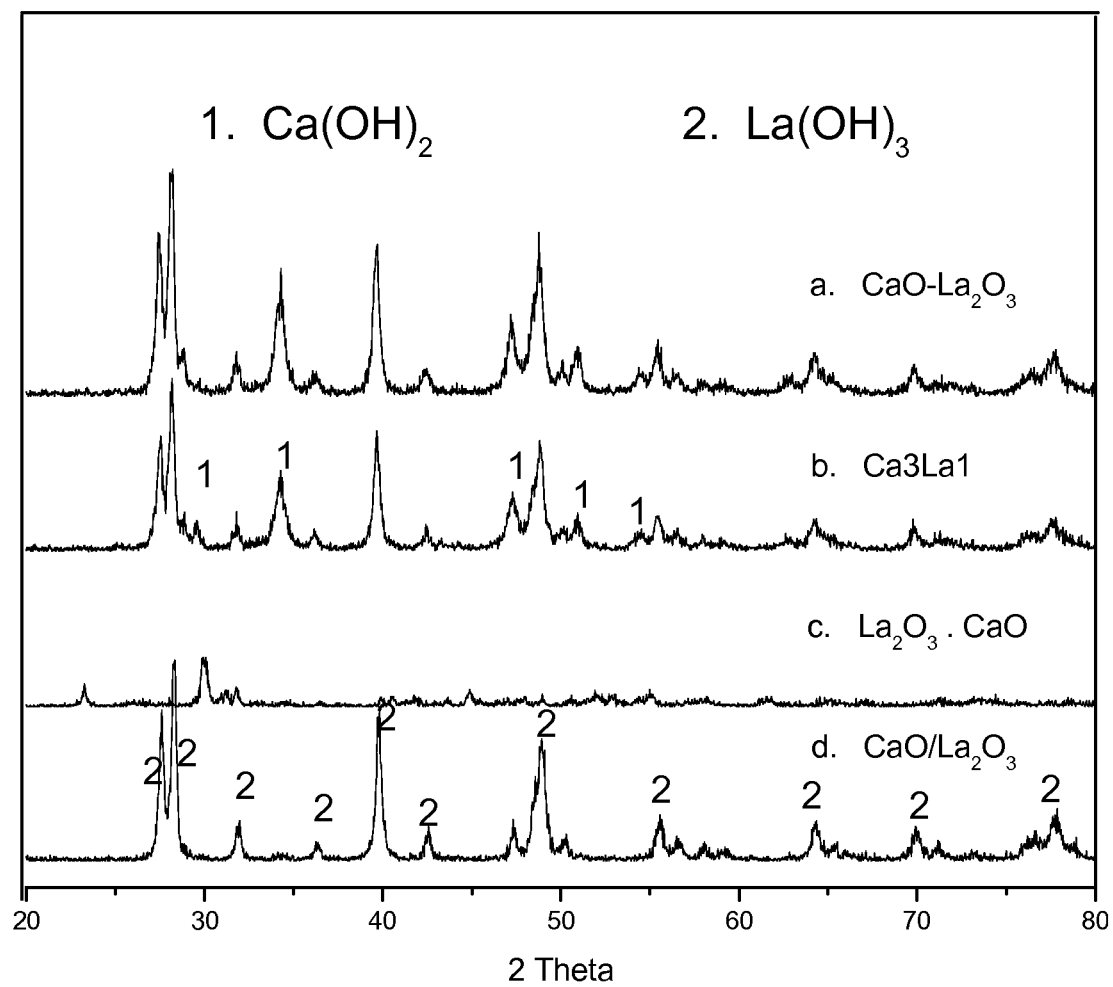
FIG. 1 is an illustration of the XRD spectrum of the Ca3La1, CaO/$La_2O_3$, $La_2O_3$.CaO, CaO—$La_2O_3$ catalysts.

"Ca3La1 catalysts" mean Ca and La-containing catalysts prepared by the ammonia-ethanol-carbon dioxide precipitation method.

"$CaO/La_2O_3$ catalysts" mean Ca and La-containing catalysts prepared by the impregnation method.

"$La_2O_3.CaO$ catalysts" mean Ca and La-containing catalysts prepared by the co-precipitation method.

"$CaO—La_2O_3$ catalysts" mean Ca and La-containing catalysts prepared by the physical mixing method.

BE means binding energy.
BET means the Brunauer-Emmett-Teller model.
DTG means differential thermal analysis.
EDS means energy dispersive spectrometry.
FAME means fatty acid methyl esters.
FFA means free fatty acid.
TG means thermogravimetric analysis.
XPS means X-ray photoelectron spectroscopy.
XRD means X-ray diffraction.

Prior art calcium-containing catalysts showed much lower activities than NaOH, a conventional homogeneous catalyst. Transesterification reactions using these catalysts usually are conducted at elevated temperatures and pressures. Thus, it is desirable to maximize the surface concentration of active catalytic sites. High-loading of active components, however, cannot be easily obtained using an impregnation method. High-loading of active components may be obtained using physical mixing. A major drawback of the physical mixing method is low crystallinity of the catalysts, which has a negative effect on the catalytic activity. Furthermore, a high-loading catalyst generally results in a low specific surface area, and thus low surface concentration of catalytic sites for transesterification.

Precipitation methods show some promise in obtaining a high concentration of active catalytic sites. However, the effects of precipitants and preparation process on the structure of Ca-based solid catalysts and their performance in oil transesterification with methanol are not well-understood. For example, Ca and Zn mixed oxide catalysts were prepared using $Na_2CO_3$ as a precipitant. $CaO—ZrO_2$ catalysts were prepared using ammonia solution as a precipitant. Typically total deposition of metal ions is a factor affecting catalytic activity. It was found that a single precipitant usually cannot effectively precipitate all metal ions in a solution.

According to one embodiment of the present disclosure, novel catalysts for biodiesel production are provided. The effects of multiple precipitants on the structure and performance of the novel catalysts are disclosed. The new catalysts are prepared through a novel catalyst preparation process. The novel catalysts are solid base catalysts, comprising a mixture of segregated lanthanum and calcium oxide crystals. The new catalysts have high activities in catalyzing oil transesterification reactions. They can convert non-refined oils into fatty acid methyl esters (FAME).

Due to the novel features of the new catalysts, transesterification reactions using the novel catalysts can utilize crude oils, waste cooking oil, and rendered animal fats. These oils are less expensive compared to food grade vegetable oils although they usually contain high content of FFA and water. Using the novel catalysts can significantly reduce the cost of producing biodiesel.

In one aspect, a multistep precipitation process was developed to prepare a $CaO—La_2O_3$ based catalyst with a relatively high base strength, basicity, specific surface area, and site concentration. The new precipitation process utilized an ammonia solution (as a base precipitant), carbon dioxide (as an acid precipitant), and ethanol (as a neutral precipitant). The Ca3La1 catalyst prepared by this novel method was compared with those prepared by physical mixing, impregnation, and co-precipitation methods. The effects of catalyst preparative parameters on catalytic activities, such as pH value of precursor metal salt solution, molar ratio of Ca to La and calcination temperature were investigated. For solid base catalysts, appropriate storage conditions work to maintain high activities of the catalysts. Thus, the effects of adsorbed triglyceride, methanol, $CO_2$ and $H_2O$ on the activities of $CaO—La_2O_3$ based catalysts were evaluated.

It was found that the ammonia-ethanol-carbon dioxide precipitation method resulted in the highest BET specific surface area, base strength and base site concentration. Moreover, without wishing to be bound by any theory, it was found that catalyst surface composition and basicity are a function of calcination temperature, precipitants, pH, and molar ratio of Ca to La in precursor solution, and storage conditions. XRD, XPS, basicity and BET tests revealed that catalyst structure and dispersion of Ca species strongly influenced the catalyst activities. High surface concentration of Ca species, strong base strength and high concentration of base sites, and high specific surface area are characteristics of an active transesterification catalyst.

In one embodiment, a heterogeneous catalyst comprises calcium hydroxide and lanthanum hydroxide, wherein the catalyst has a specific surface area of more than about 10 $m^2/g$.

The catalyst preferably has a specific surface area of about 20 $m^2/g$, more preferably about 30 $m^2/g$, even more preferably about 40 $m^2/g$, and further more preferably about 50 $m^2/g$, and even further more preferably about 62.6 $m^2/g$. In one example, the catalyst has a specific surface area of about 20.2 $m^2/g$. In another example, the catalyst has a specific surface area of about 41.5 $m^2/g$. Preferably, the catalyst has a total basicity of about 13.6 mmol/g.

Preferably, the calcium hydroxide and lanthanum hydroxide in the catalyst comprise segregated calcium hydroxide and lanthanum hydroxide crystals, respectively. Preferably, the size of the segregated calcium hydroxide crystals in the catalyst is smaller than the size of calcium hydroxide crystals in physically mixed calcium and lanthanum catalysts.

The heterogeneous catalyst may further comprise calcium oxide and lanthanum oxide.

The molar ratio of calcium to lanthanum in the heterogeneous catalyst is preferably from about 100:1 to about 1:100, more preferably from about 9:1 to about 1:3, even more preferably about 3:1. In one example, the bulk atomic ration of calcium to lanthanum in the heterogeneous catalyst is about 3.5. In another example, the surface atomic ratio of calcium to lanthanum in the heterogeneous catalyst is about 4.2.

In another embodiment, a heterogeneous catalyst comprises a calcium compound and a lanthanum compound, wherein the catalyst has a specific surface area of more than about 10 m$^2$/g, and a total basicity of about 13.6 mmol/g.

In further another aspect, a heterogeneous catalyst comprises calcium oxide and lanthanum oxide, wherein the catalyst has a specific surface area of more than about 10 m$^2$/g.

In still another embodiment, a process for producing a biofuel comprises contacting a feed material that comprises a glyceride with an alcohol in the presence of the catalyst as disclosed in the present disclosure such that at least some of the glyceride in the feed material is converted into the corresponding alcoholic ester of the glyceride.

Any suitable alcohol can be used, such as methanol, ethanol, propanol, butanol, pentanol, hexanol, heptanol, octanol, nonanol, decanol, and the like. Preferably, the alcohol is methanol.

Any suitable feed material can be used. For example, the feed material can be a non-refined oil, such as crude oils, waste cooking oil, rendered animal fats, and the like. The feed material may further comprise water. In one example, the water content in the feed material is more than about 0.15 weight %.

The feed material may further comprise one or more free fatty acids. In one example, the free fatty acid content in the feed material is more than about 0.5 weight %.

The process for producing a biofuel may further comprise activating the catalyst in nitrogen before contacting the feed material.

In still another embodiment, a process for producing a biofuel comprises contacting a feed material that comprises a glyceride and at least one free fatty acid with an alcohol in the presence of the catalyst as disclosed in the present disclosure such that at least some of both the glyceride and the at least one free fatty acid in the feed material are converted into the corresponding alcoholic esters of the glyceride and the free fatty acid, respectively.

In yet another aspect, a process for preparing a catalyst comprises introducing a base precipitant, a neutral precipitant, and an acid precipitant to a solution comprising a first metal ion and a second metal ion to form a precipitate, and calcining the precipitate to provide the catalyst.

Preferably, the introducing step comprises introducing the base precipitant to the solution comprising the first metal ion and the second metal ion to form a first precipitant solution, introducing the neutral precipitant to the first precipitant solution to form a second precipitant solution, and introducing the acid precipitant to the second precipitant solution to form the precipitate.

Preferably, the base precipitant comprises an ammonia solution. Preferably, the neutral precipitant comprises an alcohol, such as methanol, ethanol, propanol, butanol, pentanol, hexanol, heptanl, octanol, nonanol, decanol, and the like. More preferably, the alcohol is ethanol. Preferably, the acid precipitant comprises carbon dioxide.

Preferably, the carbon dioxide is introduced at the boiling temperature of the solution. Preferably, the pH of the solution is maintained above about 7 by the base precipitant during the precipitation process, and more preferably at about 7.5, and even more preferably at about 9.

The calcining step is carried out preferably at about 300-1,000° C., more preferably at about 300-950° C., even more preferably at 450-950° C., and further more preferably at about 780° C.

In one example, the first metal ion in the process is a calcium ion. Preferably, the first metal ion is a calcium ion. The calcium ion can be from any suitable calcium salt, such as calcium acetate, calcium chloride, calcium nitrate, calcium carbonate, calcium citrate, calcium cyanide, calcium hydroxide, calcium nitrite, calcium phosphate, calcium sulfate, and the like. Preferably, the calcium salt is calcium acetate. In another example, the second metal ion is a lanthanum ion. The lanthanum ion can be from any suitable lanthanum salt, such as lanthanum acetate, lanthanum chloride, lanthanum nitrate, lanthanum carbonate, lanthanum citrate, lanthanum cyanide, lanthanum hydroxide, lanthanum nitrite, lanthanum phosphate, lanthanum sulfate, and the like. Preferably, the lanthanum salt is lanthanum nitrate.

The molar ratio of calcium to lanthanum in the process is preferably from about 100:1 to about 1:100, more preferably from about 9:1 to about 1:3, even more preferably about 3:1.

In further another aspect, a process of for preparing a catalyst comprises introducing an ammonia solution to a solution comprising calcium and lanthanum ions to form an ammonia metal ion solution, heating the ammonia metal ion solution to boiling, and introducing ethanol to the boiling ammonia metal ion solution to form an ammonia ethanol solution. The process further comprises introducing carbon dioxide to the ammonia ethanol solution to form a precipitate, and calcining the precipitate to form the catalyst.

The new catalyst preparation method and the catalysts prepared by same enable the use of unrefined or waste oils in biodiesel production, and the development of an active heterogeneous base catalyst for biodiesel production. For biodiesel production, it is not uncommon that the cost of oils accounts for up to 70-90% of biodiesel production cost. Therefore, reducing the cost of oil feedstock has an impact on the economics of biodiesel production. From the catalyst aspect, traditional methods use homogeneous base catalysts which usually result in engineering and environmental problems, as well as considerable cost in separating them from the final product. Using the novel heterogeneous base catalysts can alleviate these problems. The novel catalysts are highly active, relatively easy to be separated and recovered from biodiesel products, low corrosive, and minimize the environmental problems in conventional methods.

Effect of Catalysts Preparation Methods.

The XRD spectrum of Ca—La metal oxide catalysts which were prepared by four different preparation methods were shown in FIG. 1. For the Ca3La1 catalysts, Ca(OH)$_2$ and La(OH)$_3$ phases were identified, indicating that Ca3La1 consisted of a mixture of each hydroxide. For CaO/La$_2$O$_3$, only the La(OH)$_3$ phase was identified and no Ca crystalline peaks were detected, even though the EDS results (Table 1) show that the CaO/La2O3 catalyst had a bulk Ca to La ratio of about 0.3. The XRD spectrum of the CaO/La$_2$O$_3$ also shows that there was a slight shift of the peaks at 27.2° and 28.0° which corresponded to the (1, 1, 0) and (1, 0, 1) planes of La(OH)$_3$, respectively. These shifts of the peaks suggest that La$^{3+}$ ions in the host lattice were partially substituted by Ca$^{2+}$ ions. For La$_2$O$_3$.CaO, there were no evident diffraction patterns of Ca or La species, suggesting a highly amorphous nature of this material. For CaO—La$_2$O$_3$, the physically mixed sample, both Ca(OH)$_2$ and La(OH)$_3$ phases were found. However, the half-width of peaks of Ca(OH)$_2$ and La(OH)$_3$ phases were smaller than those of the Ca3La1 catalyst, indicating that the crystal size of CaO—La$_2$O$_3$ was larger than Ca3La1. The XRD measurements suggest that calcium can exists as segregated Ca(OH)$_2$ crystals (as in Ca3La1 and CaO—La$_2$O$_3$), incorporated into the La species lattice (as in CaO/La$_2$O$_3$), or amorphous form (as in La$_2$O$_3$.CaO), as a result of different preparation procedures.

TABLE 1

BET Specific Surface Area, Surface Atomic Ratio Of Ca To La, Bulk Molar Ratio Of Ca To La, Basicity Of Ca3La1, Cao/La$_2$O$_3$, La$_2$O$_3$•Cao, And Cao—La$_2$O$_3$.

| Catalyst And Preparation Method | Bulk atomic ratio of Ca:La | Specific Surface Area m²/g | Surface atomic ratio of Ca:La | Basicity mmol/g 6.8 < H_ < 7.2 | 7.2 < H_ < 9.8 | 9.8 < H_ < 15 | Total Basicity mmol/g |
|---|---|---|---|---|---|---|---|
| Ca3La1, Ammonia-ethanol-carbon dioxide precipitation | 3.5 | 62.6 | 4.2 | 2.0 | 10.4 | 1.2 | 13.6 |
| CaO/La$_2$O$_3$, Impregnation | 0.3 | 5.3 | 2.7 | 5.1 | 3.4 | \ | 8.5 |
| La$_2$O$_3$•CaO, Co-precipitation | 0.4 | 9.9 | 0.7 | 0.8 | \ | \ | 0.8 |
| CaO—La$_2$O$_3$, Physical mixing | 3.5 | 6.2 | 3.1 | 3.8 | 2.1 | \ | 5.9 |

The base sites over heterogeneous catalysts are active centers for transesterification. Thus, the correlation between the effects of both base strength and basicity of the catalysts on catalyst activities were investigated. As indicated in Table 1, Ca3La1 shows the highest value in base strength (about 9.8<R<15). Moreover, the total basicity of the catalysts is in the order of: Ca3La1>CaO/La$_2$O$_3$>CaO—La$_2$O$_3$>La$_2$O$_3$/CaO. As discussed above, Ca3La1 exhibits the best transesterification activity among these catalysts.

The catalysts prepared by traditional methods have low BET surface areas (<about 10 m²/g) as compared to Ca3La1 (about 62.6 m²/g, Table 1). XPS and EDS results show that surface atomic molar ratios of Ca to La for Ca3La1, CaO/La$_2$O$_3$ and La$_2$O$_3$.CaO catalysts are higher than bulk ones. This suggests that the ammonia-ethanol-carbon dioxide precipitation method, impregnation method and co-precipitation method can promote Ca dispersion on the surface of the catalysts.

Figure 2:
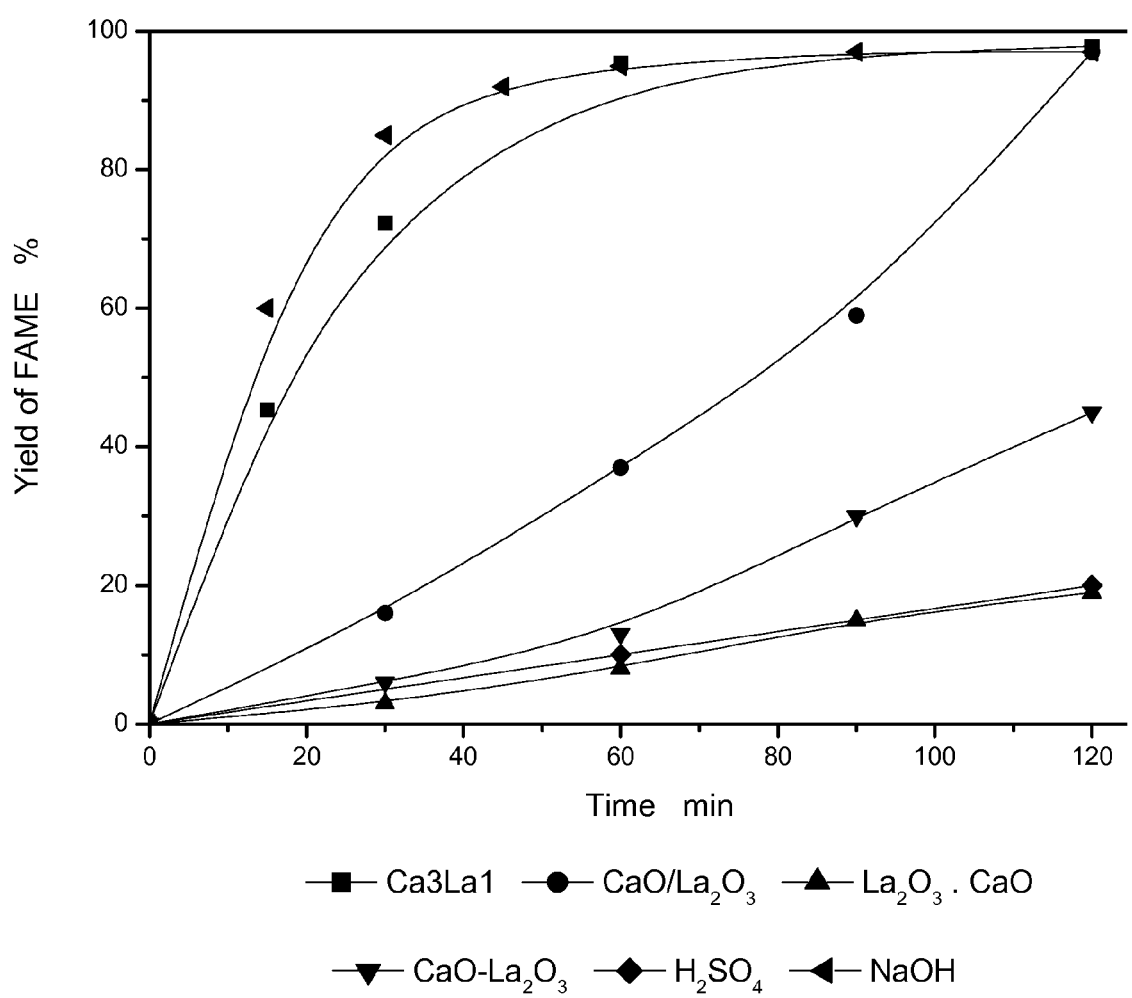
FIG. 2 is an illustration of the transesterification activities of the Ca3La1, CaO/$La_2O_3$, $La_2O_3$.CaO, CaO—$La_2O_3$, $H_2SO_4$ and NaOH catalysts. The reaction conditions were as follows: for Ca3La1, CaO/$La_2O_3$, $La_2O_3$.CaO, CaO—$La_2O_3$: about 10 g of soybean oil, about 7.6 g of methanol, and about 0.5 g of the respective catalyst at about 65° C.; for $H_2SO_4$: about 20 g of soybean oil, about 7.3 g of methanol, and about 0.6 g of $H_2SO_4$ at about 65° C.; and for NaOH: about 20 g of soybean oil, about 4.5 g of methanol, and about 0.2 g of NaOH at about 65° C.

The catalytic performance of Ca—La based catalysts prepared by different preparation methods is presented in FIG. 2. The FAME yields after one hour for these catalysts were between that achieved by homogeneous NaOH or H$_2$SO$_4$ catalysts. Ca3La1 needed about 60 minutes to achieve the highest FAME yield (about 95.3%), which shows a similar catalytic activity to NaOH and is higher than CaO/La$_2$O$_3$, CaO—La$_2$O$_3$ and La$_2$O$_3$.CaO. The catalytic activity trend of Ca3La1, CaO/La$_2$O$_3$, CaO—La$_2$O$_3$ and La$_2$O$_3$.CaO parallels with the variability of total basicity in Table 1; i.e. the higher the basicity, the higher the activity of the catalyst.

The effect of catalyst components was also studied. Using an ammonia-ethanol-carbon dioxide precipitation method, binary metal oxides catalyst, Ca3La1, single CaO-containing, and single La$_2$O$_3$-containing catalysts were prepared. Binary metal oxides catalyst has a higher activity than single metal oxides. There was a strong interaction between Ca and La species in the binary catalyst prepared by the ammonia-ethanol-carbon dioxide precipitation method, which resulted in high basicity, high BET surface area and high catalytic activity in oil transesterification.

Effect of Calcination Temperature.

The effects of preparative parameters of the ammonia-ethanol-carbon dioxide precipitation method, such as calcination temperature, calcium loading, pH value, ammonia, CO$_2$ and alcohol addition, and storage conditions, were investigated to optimize the catalyst structure and activities.

Figure 3:
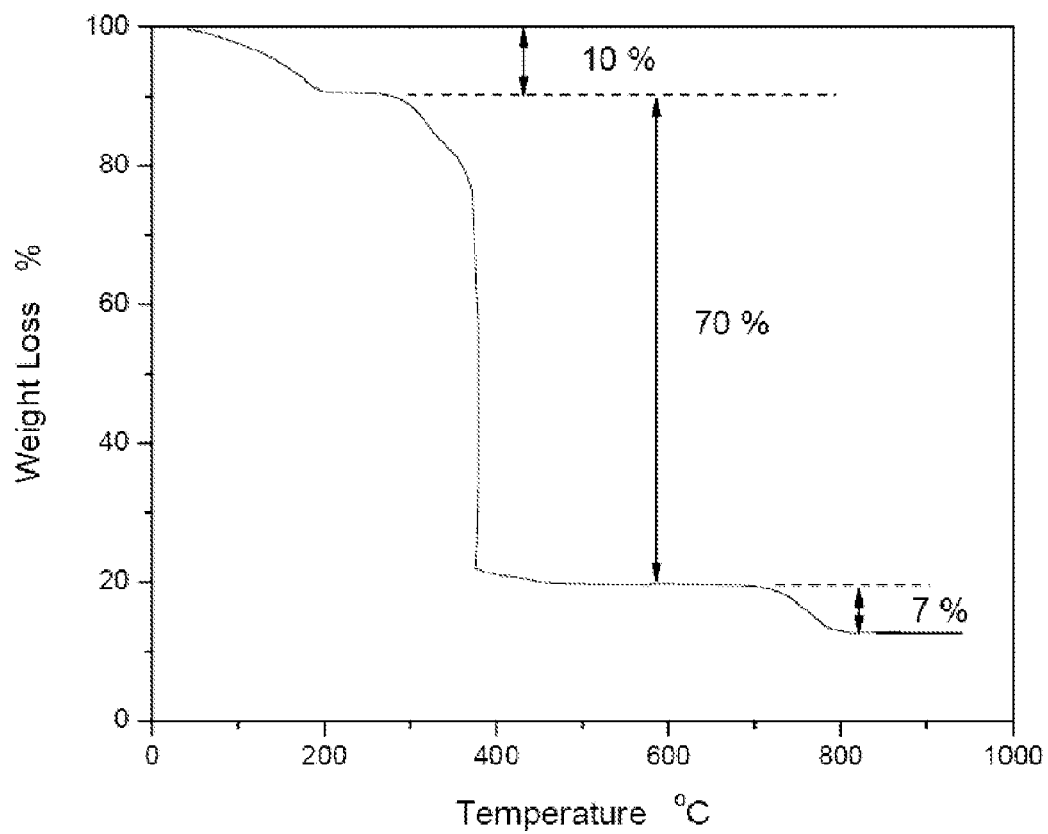
FIG. 3 is an illustration of the weight losses as a function of the temperatures of uncalcined Ca3La1 catalysts.

FIG. 3 is a TG curve of uncalcined Ca3La1. The total weight loss from 50° C. to 920° C. was about 87%. The weight loss before 200° C. was about 10% which corresponded to the desorption of physically adsorbed molecules (H$_2$O and CO$_2$). The weight loss from 300~430° C. was about 70% which can be attributed to the decomposition of Ca(OH)$_2$, La(OH)$_3$ and Ca(OCH$_2$CH$_3$)$_2$. Lastly, the weight loss at 700~780° C. was considered to be the decomposition of carbonate salts such as CaCO$_3$ and La$_2$CO$_5$.

Figure 4:
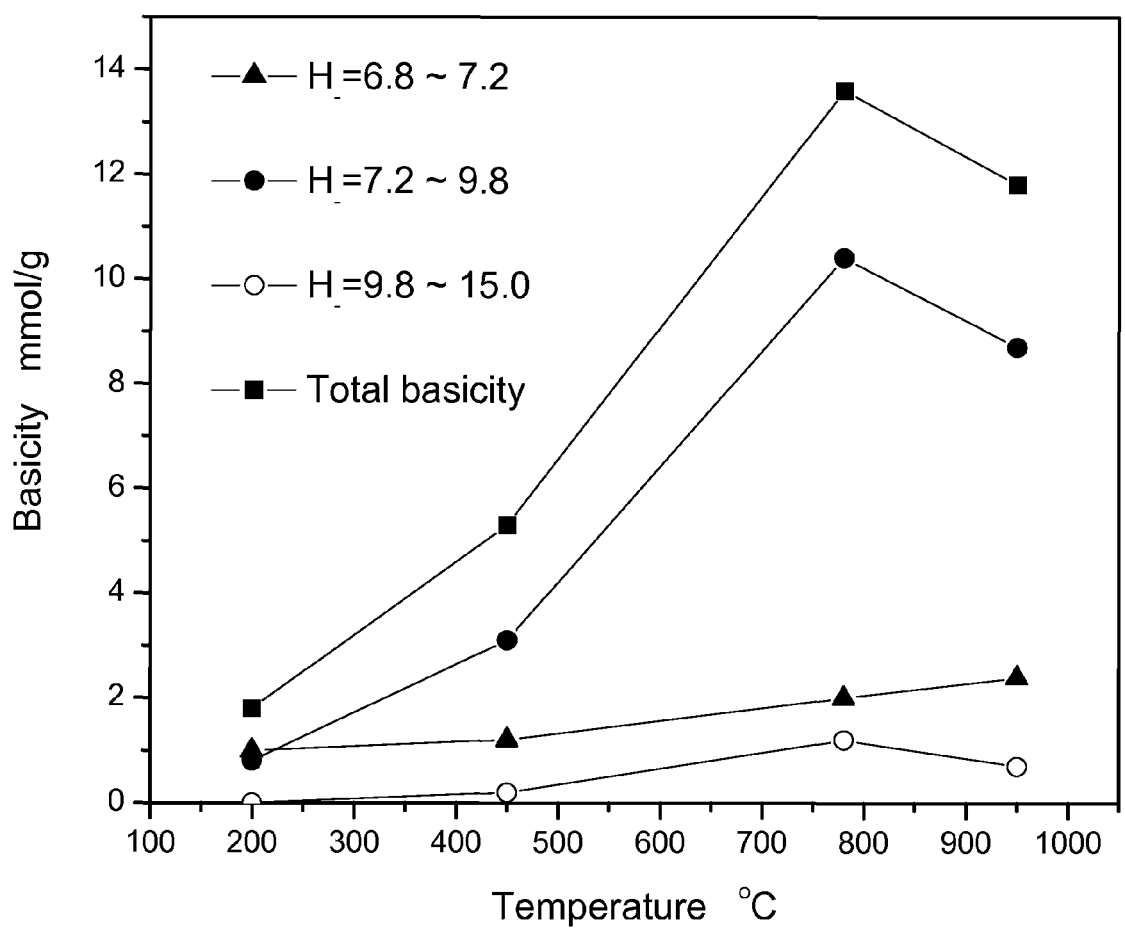
FIG. 4 is an illustration of the basicity of the Ca3La1 catalysts calcined at different temperatures.

Based on the TG curve, the Ca3La1 catalyst was calcined at about 300° C., 450° C., 780° C. and 950° C. respectively, and the total basicities were measured (FIG. 4). It can be observed that the basicity of the catalysts initially increased with the calcination temperature and reached a maximum at about 780° C.; but decreased when the calcination temperature exceeded about 780° C. BET surface area in Table 2 shows a similar trend. The temperature of about 780° C. was considered to be the preferred calcination temperature to obtain a good value in both basicity and BET surface area. Not wishing to be bound by any theory, it is understood that the freshly calcined Ca3La1 catalysts comprise CaO and La$_2$O$_3$. However, these Ca3La1 catalysts are strong bases and the oxides in the catalysts could quickly change into Ca(OH)$_2$, CaCO$_3$, La(OH)$_3$, and the like when the catalysts are exposed to the ambient atmosphere for a short period of time, for example, even for several minutes.

TABLE 2

BET Specific Surface Area, Surface Atom Ratio Of Ca To La, Binding Energy And Surface Percentages Of La, Ca And Lattice Oxygen.

| Catalyst calcination temp. | Binding Energy (eV) | | | | Surface Percentage (atm. %) | | | Surface Atom Ratio of | Specific Surface Area |
|---|---|---|---|---|---|---|---|---|---|
| °C. | $La_{3d}$ | $Ca_{2p\,1}$ | $Ca_{2p\,2}$ | $O_{lat}$ | $O_{lat}$ | $Ca^{2+}$ | $La^{3+}$ | Ca:La | $m^2/g$ |
| 300 | 833.4 | 347.9 | 346.7 | 528.7 | 60.6 | 3.2 | 0.6 | 5.3 | 5.0 |
| 450 | 833.7 | 347.6 | 346.3 | 529.0 | 62.2 | 5.6 | 2.1 | 2.7 | 41.5 |
| 780 | 833.6 | 348.2 | 346.7 | 528.9 | 70.8 | 12.5 | 3.0 | 4.2 | 62.6 |
| 950 | 833.8 | 348.0 | 346.5 | 528.9 | 60.3 | 11.3 | 4.6 | 2.4 | 20.2 |

The chemical state and surface composition of the catalysts as determined by XPS are shown in Table 2. The binding energy (BE) of La $3d_{5/2}$ remained constant at 833.4~833.8 eV as calcination temperature increased. The BE of the two Ca $2P_{3/2}$ components were at 347.6~348.2 eV for $CaCO_3$ and 346.3~346.7 eV for $Ca(OH)_2$ species, respectively. Therefore, it appears that the outermost surface layers of the catalyst was carbonated and hydrated. The presence of CaO can be neglected since the BE of Ca in CaO is below that of $Ca(OH)_2$ and it is not observable in the XPS spectra. The difference between the TG curve, XPS and XRD can be attributed to contact with the ambient environment when preparing XPS and XRD samples. CaO in fresh catalysts could react with $H_2O$ and $CO_2$ in the air, forming hydroxide and carbonate salts. Thus, there is no characteristic BE line for CaO. Two photoemission lines can be seen for $O_{1s}$, which correspond to two distinct oxygen species. The line with low BE (528.7~529.1 eV) was attributed to oxygen ions in the crystal lattice ($O_{latt}$); the line (530.8~531.2 eV) was to the adsorbed oxygen. Crystal lattice oxygen has a strong Lewis base site and it is generally considered as the active center for oil transesterification. Table 2 shows that the surface concentration of $O_{latt}$ and $Ca^{2+}$ initially increased with calcination temperature, reached the highest value at about 780° C., and then decreased with further increase in temperature. On the other hand, surface $La^{3+}$ kept increasing with calcination temperature.

Figure 5:
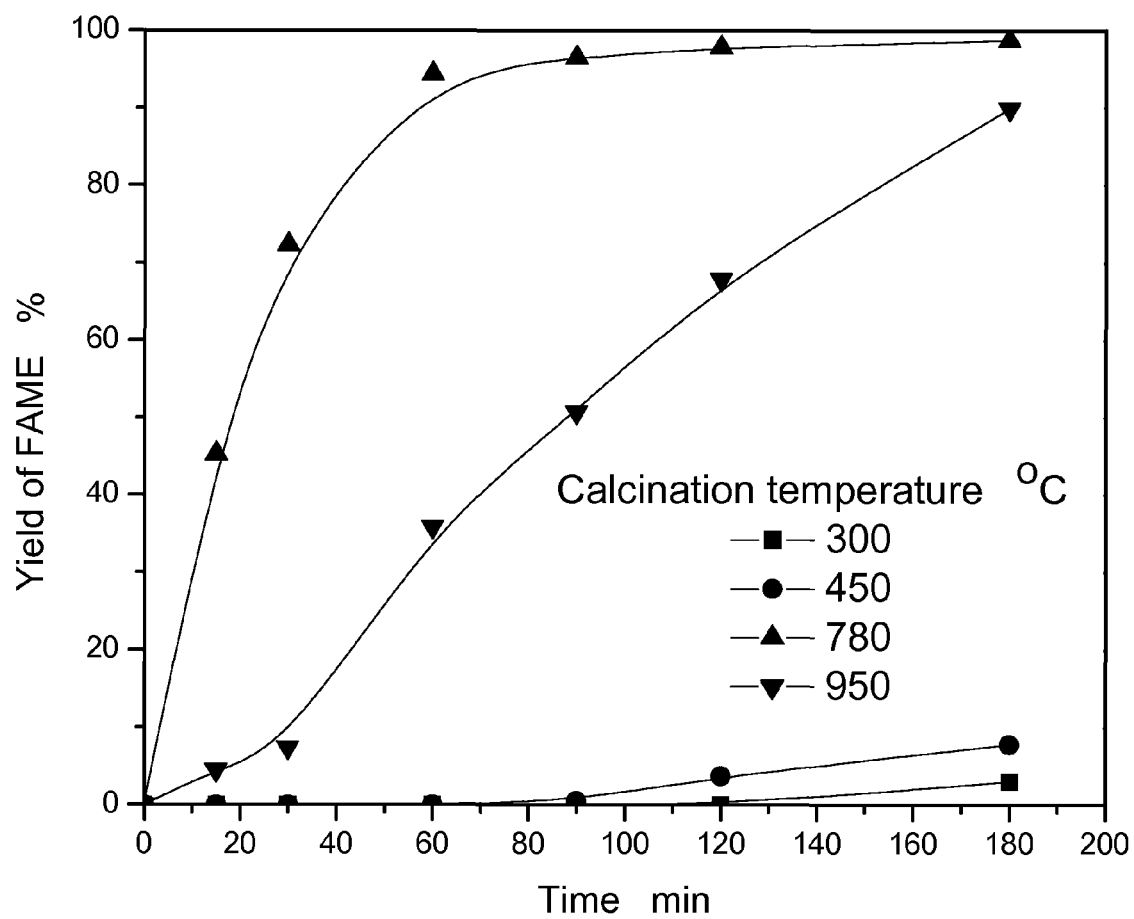
FIG. 5 is an illustration of the yield of FAME in transesterification reactions using Ca3La1 catalysts calcined at about 300° C., about 450° C., about 780° C. and about 950° C., respectively. The reaction conditions were as follows: about 10 g of soybean oil, about 7.6 g of methanol, and about 0.5 g of the respective catalyst at about 65° C.

The effect of calcination temperature on the catalytic activity of Ca3La1 is shown in FIG. 5. The catalyst calcined at about 780° C. shows the highest activity and a FAME yield of about 95.3% was obtained in about 90 minutes. The catalysts calcined at about 300° C. and 450° C. show low conversions even with an extended reaction time (about 180 minutes). The catalyst calcined at about 950° C. shows a relatively high activity, and a yield of about 87.8% was reached after about 180 minutes. Catalyst activity increased with calcination temperature until about 780° C. and then slightly decreased with further temperature increase. The catalyst activities also displayed a similar pattern as basicity (FIG. 4), BET surface area and surface $Ca^{2+}$ and $O_{latt}$ concentration (Table 2) as a function of calcination temperature.

Effect of Precipitants.

Table 3 shows the catalyst structure and performance of precipitates of ammonia solution, ethanol and $CO_2$. Using an $NH_3$ solution, major precipitates formed were hydroxides such as $La(OH)_3$ and $Ca(OH)_2$. EDS results show that for Ca3La1-$NH_3$ catalyst, the bulk molar ratio of Ca to La is only 0.4, which is much lower than that of the original precursor solution (3:1 of Ca to La). This suggests that Ca ions present in the original solution were not totally precipitated. BET results show that it has a low specific surface area as compared to Ca3La1. The Hammett indicator results show that it had a low base strength and small amount of basicity. Correspondingly, the FAME yield using Ca3La1-$NH_3$ was about 5.6% after about 90 minutes. Using $CO_2$ as the precipitant, carbonates such as $CaCO_3$ and $La_2CO_5$ were formed. Similar to CaLa1-$NH_3$, Ca3La1-$CO_2$ has a low bulk ratio of Ca to La, low BET surface area, and poor basicity resulting in a poor transesterification activity. When ethanol was used as the precipitant, the major precipitate formed is ethylate. Ca3La1-$CH_3CH_2OH$ exhibited a high specific surface area and a wide distribution of base strength (Table 3). However, it still had a low bulk ratio of Ca to La, and low FAME yield (about 32.1% after about 90 minutes). However, Ca3La1 catalyst, in which ammonia, ethanol and $CO_2$ were sequentially used as precipitants, had the highest bulk ratio of Ca to La, highest total basicity and highest FAME yield among the catalysts tested.

TABLE 3

Bulk Molar Ratio Of Ca To La, BET Specific Surface Area, Basicity And Yield Of FAME Of Ca3La1—$NH_3$, Ca3La1—$CO_2$, Ca3La1—$CH_3CH_2OH$ And Ca3La1. The Reaction Conditions Were About 10 g Of Soybean Oil, About 7.6 g Of Methanol, And About 0.5 g Of Catalyst At 65° C.

| Catalyst | Bulk atomic ratio of Ca:La | Specific Surface Area $m^2/g$ | Basicity mmol/g | | | Total Basicity mmol/g | Yield of FAME % [1] |
|---|---|---|---|---|---|---|---|
| | | | 6.8 < H_ < 7.2 | 7.2 < H_ < 9.8 | 9.8 < H_ < 15 | | |
| Ca3La1—$NH_3$ | 0.4 | 7.1 | 0.2 | \ | \ | 0.2 | 5.6 |
| Ca3La1—$CO_2$ | 1.6 | 17.4 | 1.1 | 0.7 | \ | 1.8 | 27.9 |
| Ca3La1—$CH_3CH_2OH$ | 1.2 | 66.9 | 1.3 | 7.2 | 1.0 | 9.5 | 32.1 |
| Ca3La1 | 3.5 | 62.6 | 2.0 | 10.4 | 1.2 | 13.6 | 95.3 |

In this sequential precipitation approach, the addition of the $NH_3$ solution (base precipitant) could quickly increase pH value of the precursor solution. Bubbling in $CO_2$ (acid precipitant) led to the formation of carbonate and slightly decreased the pH value. Thus, by adjusting the $NH_3$ and $CO_2$ addition, and maintaining the pH value, $Ca^{2+}$ and $La^{3+}$ can be precipitated in the desired ratio from the precursor solution. There are two possible functions of ethanol. Firstly, during the calcination process, the ethylate decomposes and generates a large amount of $CO_2$ and $H_2O$. These gases may expand the volume of catalyst precursor and lead to the formation of micropores which yields a high specific surface area. Secondly, base strength of CaO prepared from $CaOCH_2CH_3$ is much higher than that prepared from $CaCO_3$ and $Ca(OH)_2$. Thus, ethanol may enhance the catalyst basicity. The synergy among the three precipitants leads to a more complete and uniform precipitation and a high specific surface area, base strength and basicity, resulting in a high transesterification activity.

Effect of Precursor Solutions.

Figure 6:
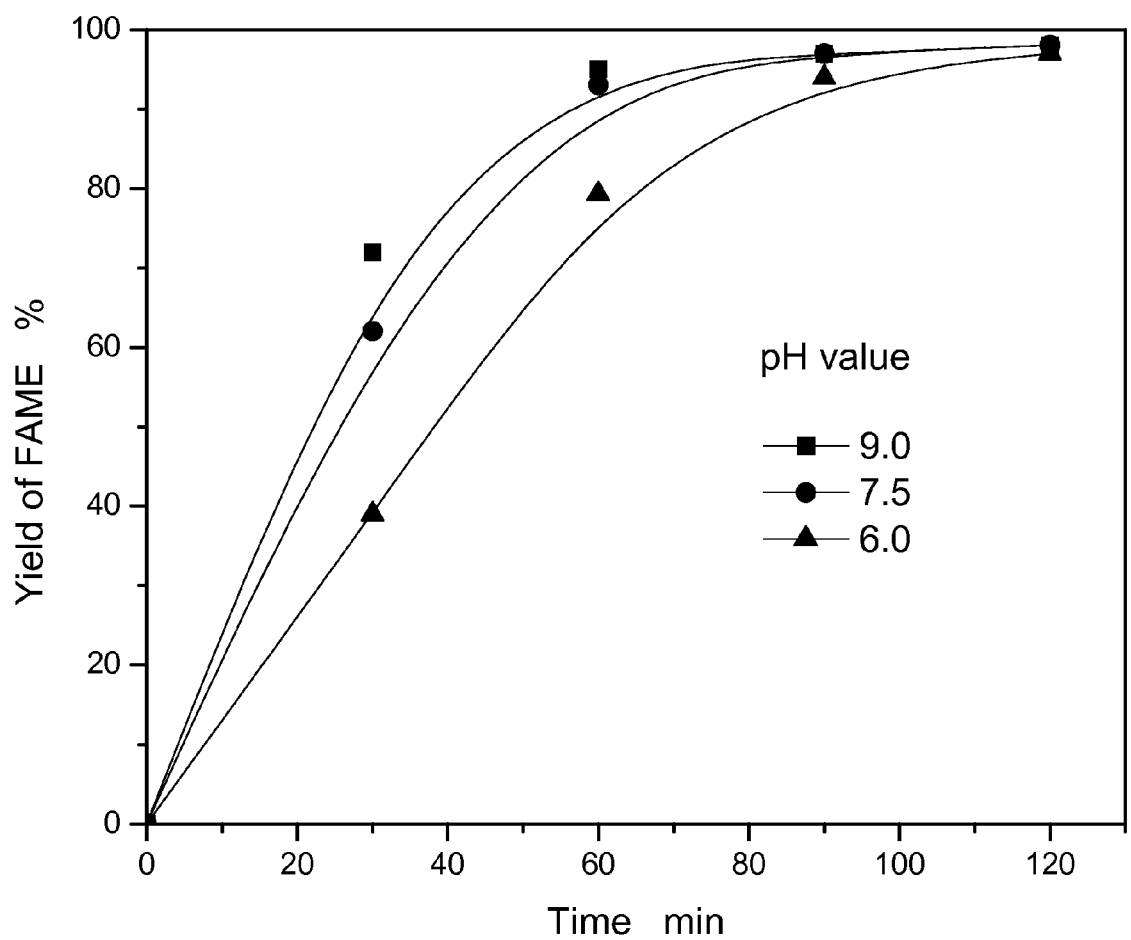
FIG. 6 is an illustration of the yield of FAME in transesterification reactions using Ca3La1 catalysts prepared from the precursor solution with a pH of about 6.0, about 7.5, and about 9.0, respectively. The reaction conditions were as follows: about 10 g of soybean oil, about 7.6 g of methanol, and about 0.5 g of the respective catalyst at about 65° C.

Table 4 shows that if the pH value was kept at about 6.0 or about 7.5, the final catalyst had a relatively low bulk molar ratio of Ca to La, which suggests that $Ca^{2+}$ in precursor solution was not fully precipitated. XPS results show that the surface percentage of lattice oxygen, and the $Ca^{2+}$ and $La^{3+}$ increased with pH value of precursor solution, and led to a higher catalytic activity (FIG. 6). The pH value and molar ratio of Ca to La in the precursor solution have an impact on the precipitation process.

TABLE 4

Effects Of pH Value Of The Precursor Solution On The Bulk Molar Ratio Of Ca To La And Surface Percentages Of La, Ca And Lattice Oxygen.

| pH value of precursor solution | Bulk atomic ratio of Ca to La | Surface Percentage (atm. %) | | |
|---|---|---|---|---|
| | | $O_{lat}$ | $Ca^{2+}$ | $La^{3+}$ |
| pH 6.0 | 2.7 | 48.2 | 3.1 | 0.5 |
| pH 7.5 | 2.8 | 54.1 | 8.2 | 0.8 |
| pH 9.0 | 3.1 | 70.8 | 12.5 | 3.0 |

Figure 7:
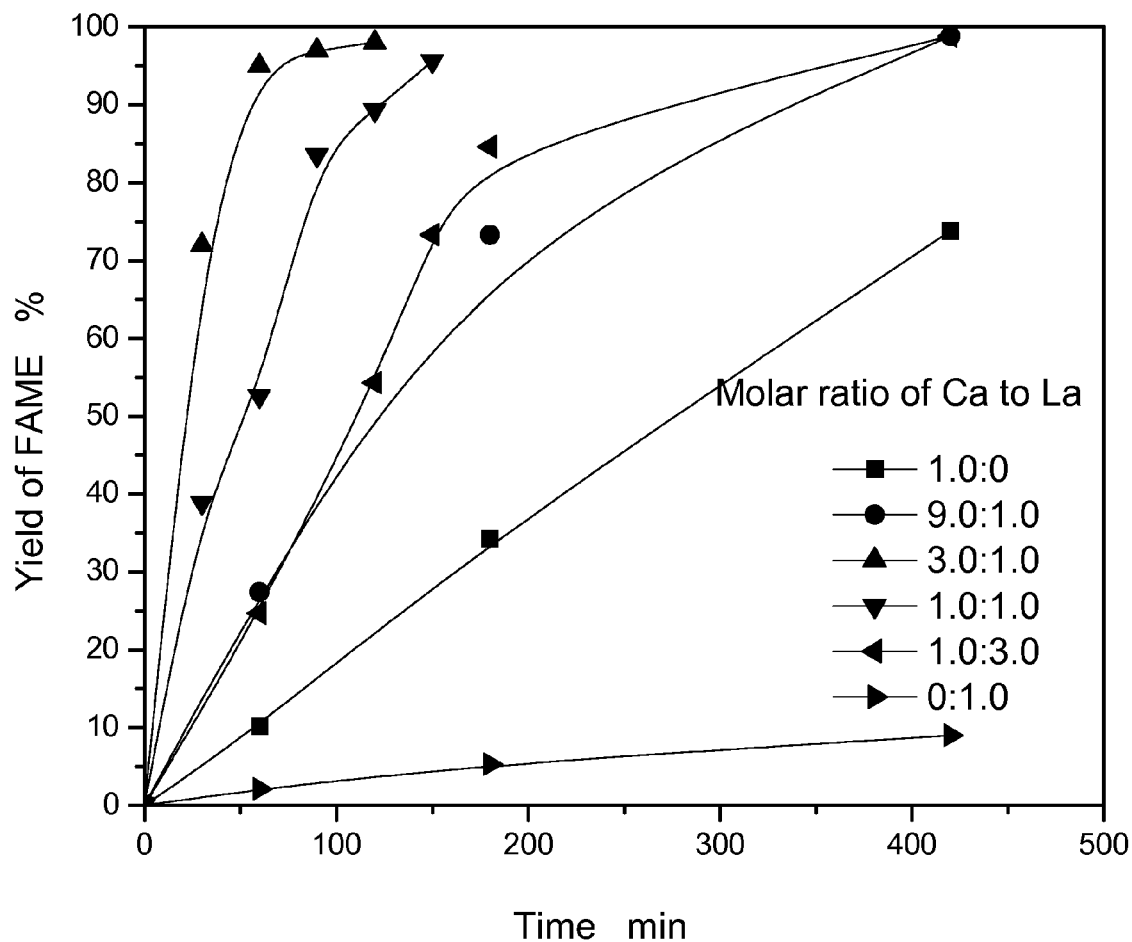
FIG. 7 is an illustration of the yield of FAME in transesterification reactions using Ca3La1 catalysts with different molar ratios of Ca to La. The reaction conditions were as follows: about 10 g of soybean oil, about 7.6 g of methanol, and about 0.5 g of the respective catalyst at about 65° C.

Table 5 shows that molar ratios of Ca to La in the precursor solution were different from those on the catalyst surface. When the molar ratio is about 3.0:1.0 in the precursor solution, the surface percentage of lattice oxygen and total amount of lattice oxygen, and the concentration of $Ca^{2+}$ and $La^{3+}$ were highest, and led to the highest catalytic activity (FIG. 7). Thus, a basic precursor solution (~pH 9.0) and ~3.0:1.0 molar ratio of Ca to La in solution were identified as the preferred conditions for the ammonia-ethanol-carbon dioxide precipitation method.

TABLE 5

Effects Of Molar Ratio Of Ca To La Of The Precursor Solution On The Surface Molar Ratio Of Ca To La And Surface Percentages Of La, Ca And Lattice Oxygen.

| Molar ratio of Ca to La in precursor solution | Surface atomic ratio of $Ca^{2+}$ to $La^{3+}$ | Surface Percentage (atm. %) | | | Total amount of $O_{lat}$, $Ca^{2+}$ and $La^{3+}$ |
|---|---|---|---|---|---|
| | | $O_{lat}$ | $Ca^{2+}$ | $La^{3+}$ | |
| 1.0:0 | \ | 37.4 | 15.3 | \ | 52.7 |
| 9.0:1.0 | 7.0:1.0 | 53.1 | 15.5 | 2.2 | 70.8 |
| 3.0:1.0 | 4.2:1.0 | 70.8 | 12.5 | 3.0 | 86.3 |
| 1.0:1.0 | 1.7:1.0 | 69.3 | 8.0 | 4.5 | 81.8 |
| 1.0:3.0 | 1.0:1.2 | 58.5 | 6.0 | 7.2 | 81.8 |
| 1.0:9.0 | 1.0:2.0 | 64.6 | 3.4 | 7.1 | 75.1 |
| 0:1.0 | \ | 51.9 | \ | 5.6 | 57.5 |

Effect of Storage Conditions.

Figure 8:
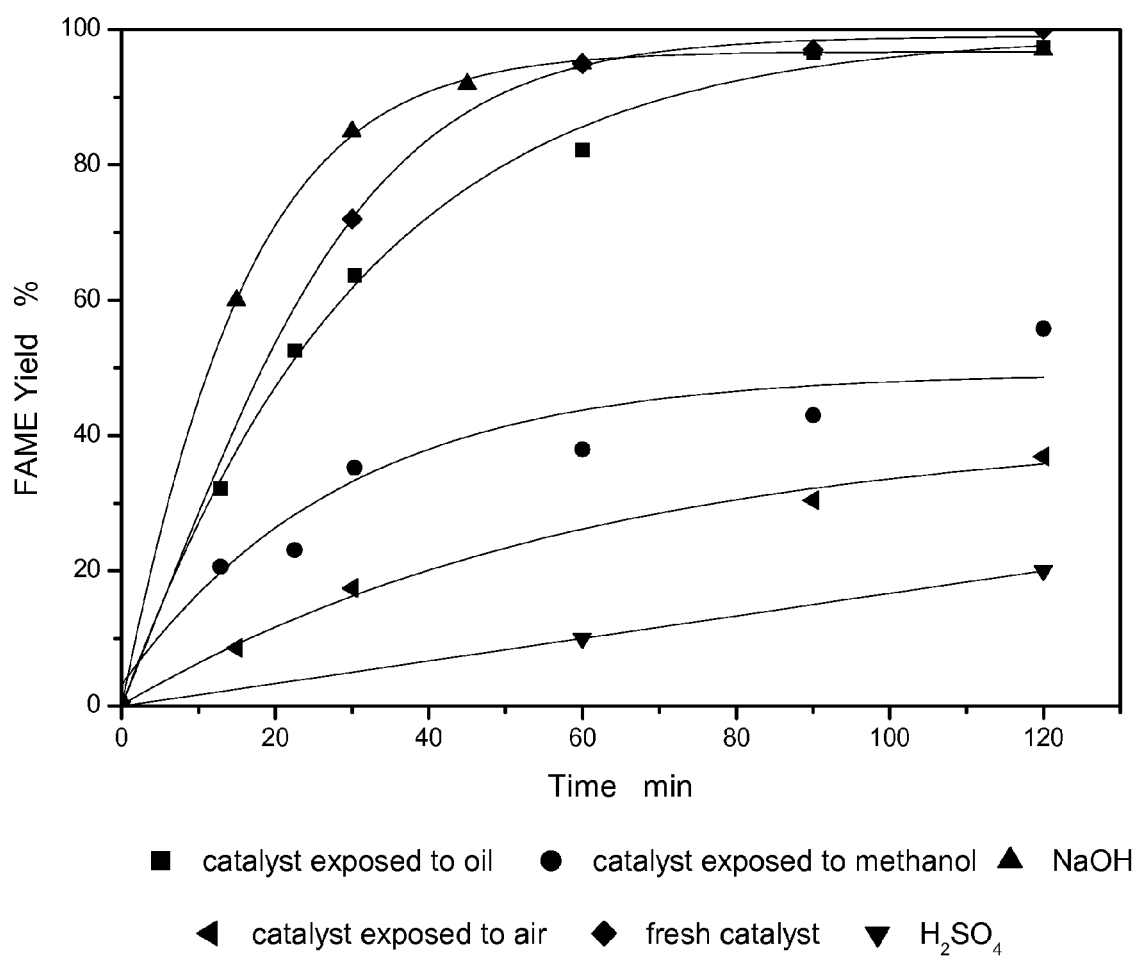
FIG. 8 is an illustration of the yield of FAME in transesterification reactions using $H_2SO_4$, NaOH, and the Ca3La1 catalysts stored in soybean oil, methanol, and air. The reaction conditions were as follows: for $H_2SO_4$: about 20 g of soybean oil, about 7.3 g of methanol, and about 0.6 g of $H_2SO_4$ at about 65° C.; for NaOH: about 20 g of soybean oil, about 4.5 g of methanol, and about 0.2 g of NaOH at about 65° C.; and for the Ca3La1 catalysts: about 10 g of soybean oil, about 7.6 g of methanol, and about 0.5 g of the catalyst at about 65° C.

Solid base catalysts are often vulnerable because they have a tendency to adsorb acid molecules from the ambient environment and lose some of their activity. $CO_2$ and $H_2O$ in air can poison basic sites on catalyst surfaces and change the bulk crystal structure of the catalysts. The effects of exposing the fresh catalysts in air, soybean oil and methanol on the activity of the catalysts were investigated. The catalysts exposed to soybean oil showed a reaction rate very similar to that of freshly activated Ca3La1 catalysts (FIG. 8). The catalysts exposed to methanol and air showed a significant decrease in catalytic activity. These findings suggest that active base sites on Ca3La1 can be protected from acidic gases in air since soybean oil is non-polar and has a relatively low pKa value (~3.55). On the other hand, methanol has a high pKa value (~15.54) with dissolved acidic gases. Thus, these soluble acidic gases may poison the basic sites and lead to a gradual loss in catalyst activity.

Catalyst Durability.

Figure 9A:
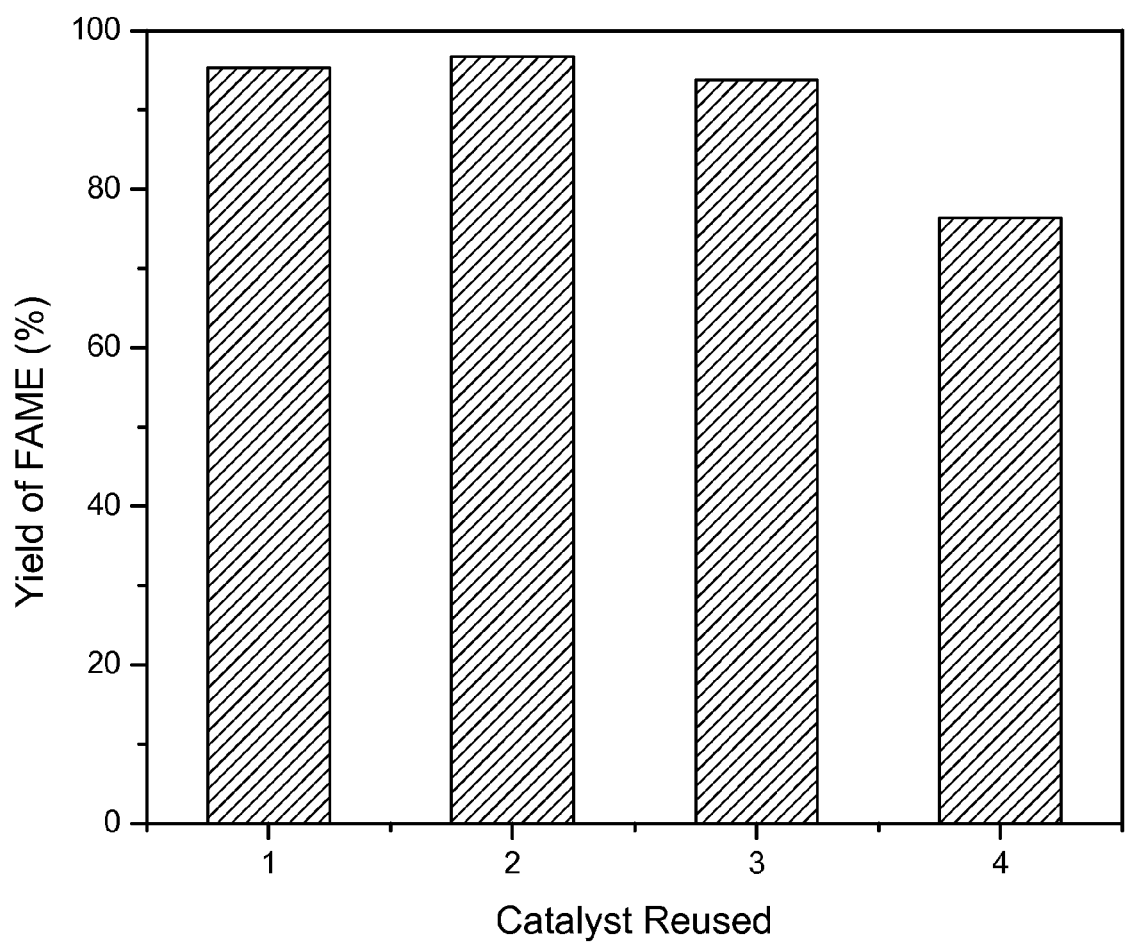
FIG. 9 is an illustration of the reusability of Ca3La1 catalyst. (A) In a batch stir reactor. The reaction conditions were as follows: about 10 g of soybean oil, about 7.6 g of methanol, and about 0.5 g of the catalyst at 65° C. (B) In a fix bed continuous reactor. The reaction conditions were as follows: molar ratio of methanol to oil of about 15:1, flow rate of about 0.2 mL/min, about 8 g of Ca3La1 catalyst, and resident time of about 120 minutes at 58° C.
Figure 9B:
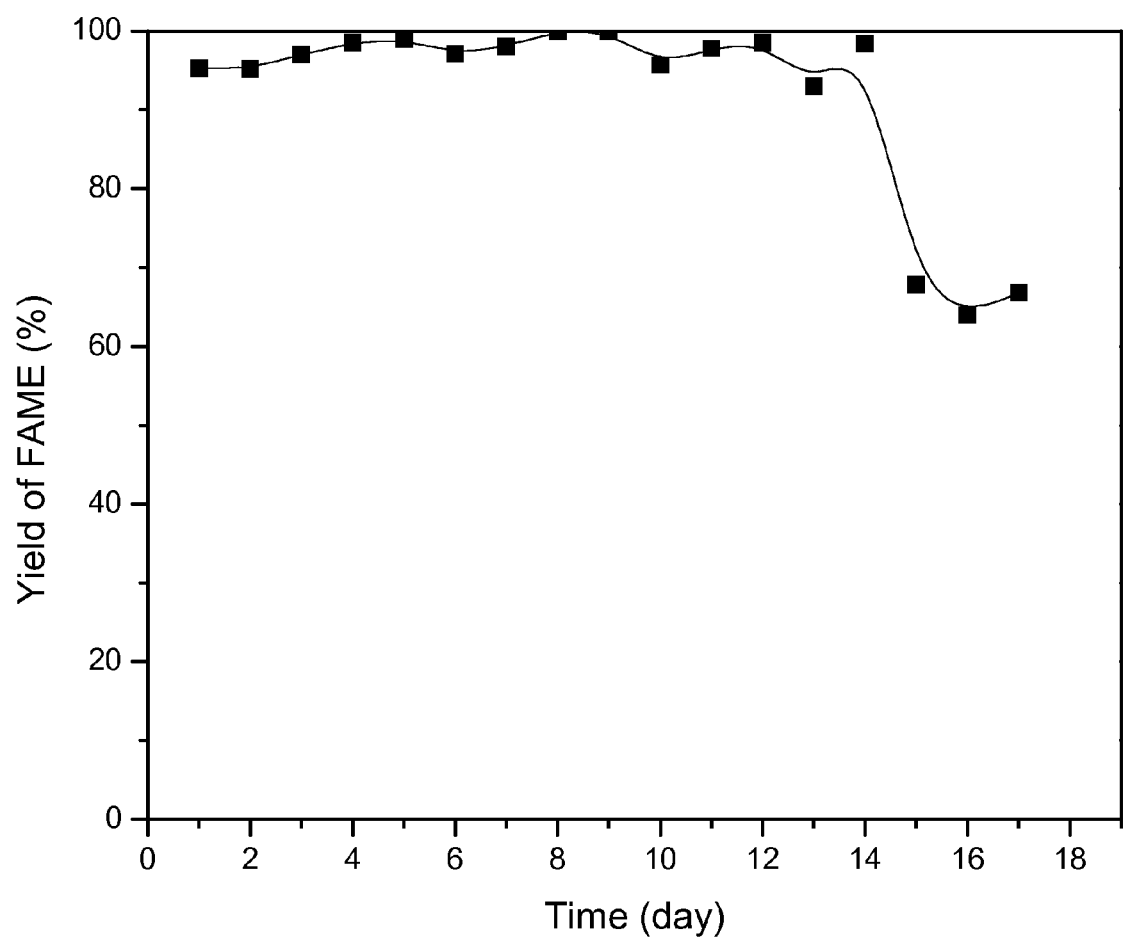

Ca3La1 catalyst was recycled three times in a batch stir reactor (see FIG. 9a). Its activity dropped in the fourth cycle. In a continuous fix bed reactor, the yield of FAME maintained higher than about 92% for 14 days, but from the $15^{th}$ day catalyst deactivation can be observed (see FIG. 9b). The deactivation of Ca3La1 catalyst may be related to active site blockage by adsorbed intermediates or product species, such as diglyceride, monoglyceride, and glycerin and the contamination by $O_2$, $H_2O$, and $CO_2$ in air. The deactivation may also be caused by leaching of catalyst components, especially for the calcium containing species.

The sequential precipitation method with ammonia solution, ethanol and carbon dioxide as precipitants for solid base catalyst preparation has been developed. A cooperative effect among the precipitants allows a more complete and uniform precipitation process, a higher specific BET surface area, higher concentration of strong base sites, and a high catalytic activity in the oil transesterification reaction for biodiesel production.

The structure of Ca and La metal oxides depends on the precipitation methods. Three types of Ca structures were observed. A first type is the Ca species segregated on the surface in the samples as prepared by the ammonia-ethanol-carbon dioxide precipitation method and the physical mixing method. Crystal size of Ca species of Ca3La1 was smaller than that of the CaO—$La_2O_3$ catalysts. A second type is Ca incorporated into the $La(OH)_3$ lattice as prepared by the impregnation method. A third type is Ca remained in a non-crystal structure as prepared by the co-precipitation method. Segregated and highly dispersed Ca species were obtained by the ammonia-ethanol-carbon dioxide precipitation method.

The calcination temperature, the nature of precipitants, the pH value, and the molar ratio of Ca to La have an effect on the catalyst structures and activities. The Ca3La1 catalysts are preferably stored in a non-polar oil to prevent contamination and deactivation from an ambient environment. Using this class of catalysts, which are relatively inexpensive because of low raw materials and manufacturing costs, simplifies the product purification process, and decreases the production cost of biodiesel.

EXAMPLES

Materials.

Soybean oil (about 0.02% of free fatty acids (FFA) and about 0.02% of water) was purchased from Costco warehouse (Detroit, Mich.). Methanol (about 0.03% water) was obtained from Mallinckrodt Chemicals (Phillipsburg, N.J.). Calcium oxide (about 99.9%), lanthanum oxide (about 99.9%), calcium acetate hydrate (about 98%), lanthanum nitrate hydrate (about 98%), ethanol (about 95%) and ammonia (about 99%) are of analysis grade, and were purchased from Sigma-Aldrich Company (St. Louis, Mo.).

Catalyst Preparation.

Ca—La series catalysts were prepared by four different methods. The catalyst can be activated in $N_2$ flow at about 700-900° C. for 1-2 hours before usage. The activation process decomposes at least some of the hydroxide and carbonates into metal oxides in order to convert the partially deactivated catalysts into active catalysts, and increase the basic properties of catalysts. All catalysts in the kinetic studies were activated at about 780° C. for about 1 hour in pure $N_2$ (about 30 mL/min) before such studies.

A. The Ammonia-Ethanol-Carbon Dioxide Precipitation Method.

Appropriate amounts of about 2 M $La(NO_3)_3$ and about 1 M $Ca(Ac)_2$ solutions were mixed, with pH value of the mixture adjusted to about 9.0 with a ~6 M ammonia solution. Stepwise addition of about 100 mL of ethanol was made about every 30 minutes (repeated four times) to the boiling mixture solution of $La(NO_3)_3$ and $Ca(Ac)_2$ to promote initial precipitate formation. This was followed by bubbling of about 30 mL/min of $CO_2$ (10 (v) % in air) for about 5 minutes at about 30 minute intervals to form a carbonate precipitate (repeated six times). The pH of the precursor solution was maintained at about 9.0 by ammonia solution throughout the entire process. The precipitate was filtered and washed with about 100 mL of ~75% ethanol solution, dried at about 150° C. for about 12 hours, calcined at about 430° C. for about 1 hour, and then at about 780° C. for about 8 hours. Catalysts prepared by the ammonia-ethanol-carbon dioxide precipitation method were labeled as Ca3La1 catalysts. When only $Ca(Ac)_2$ solution was used, the Ca-containing catalysts were labeled as CaO catalysts. When only $La(NO_3)_3$ solution was used, the La-containing catalysts were labeled as $La_2O_3$ catalysts.

When only ammonia solution was used as the precipitant, the prepared catalysts were labeled as Ca3La1-$NH_3$ catalysts. Similarly, the catalysts were labeled as Ca3La1-$CH_3CH_2OH$ catalysts and Ca3La1-$CO_2$ catalysts when only ethanol and $CO_2$ were used, respectively.

B. The Physical Mixing Method.

About eighteen grams of CaO and about 33 g of $La_2O_3$ were physically mixed with about 50 g of distilled water and then ground in a mortar. This mixture was then dried at about 100° C. for about 10 hours, and calcined at about 780° C. for about 8 hours. Catalysts prepared by the physical mixing method were labeled as CaO—$La_2O_3$ catalysts or physically mixed catalysts.

C. The Impregnation Method.

$La_2O_3$ powder was impregnated with an appropriate amount of a ~1 M $Ca(Ac)_2$ solution, followed by drying at about 100° C. for about 10 hours, and then calcined at about 780° C. for about 8 hours. The process was repeated again to obtain the desired CaO loading. The catalysts prepared by the impregnation method were labeled as CaO/$La_2O_3$ catalysts or impregnated catalysts.

D. The Co-Precipitation Method.

Appropriate amounts of about 1 M $Ca(NO_3)_2$, about 2 M $La(NO_3)_3$ and about 1 M $Na_2CO_3$ solutions were mixed with vigorous stirring. The resultant precipitate was filtered and washed with distilled water. The solid precipitate was then dried at about 100° C. for about 10 hours, and calcined at about 780° C. for about 8 hours. The catalysts prepared by the co-precipitation method were labeled as $La_2O_3$.CaO catalysts or co-precipitated catalysts.

Catalyst Characterization.

The Hammett indicator method was used to determine the basic strength of the catalyst. Basic strength was expressed by an acidity function (H_) defined by Eq. (1), where [BH-] and [B-] are the concentrations of the indicator and its conjugated base, respectively, and $pK_{BH}$ is the logarithm of the dissociation constant of the indicator used:

$$H_- = pK_{BH} + \log [B^-]/[BH] \quad (1)$$

The indicators used were as follows: neutral red ($pK_{BH}$=6.8), bromothymol blue ($pK_{BH}$=7.2), phenolphthalein ($pK_{BH}$=9.8), 2,4-dinitroaniline ($pK_{BH}$=15.0). Basicity was measured by the method of Hammett indicator-benzene carboxylic acid (0.02 mol/L anhydrous methanol solution) titration.

The specific surface area of the catalysts were determined by a Micromeritics Model ASAP 2010 surface area analyzer (North Huntingdon, Pa.) based on nitrogen adsorption/desorption isotherms acquired at 77.2 K using a 30 s equilibrium interval. The surface area was computed using the BET (Brunauer-Emmett-Teller) model. All catalyst samples were degassed at about 200° C. for about 5 hours prior to analysis to remove any adsorbed molecules from the pores and surfaces.

Thermal decomposition of the catalyst was evaluated by thermogravimetric analysis/differential thermal analysis (TG/DTG) carried out on a Perkin Elmer Pyris-1 (Waltham, Mass.), operating under a flow of nitrogen (30 mL/min) and at a 10° C./min heating rate from room temperature to 1273 K.

Powder X-ray diffraction (XRD) patterns were taken with a Rigaku RU2000 rotating anode powder diffractometer (Woodlands, Tex.) equipped with CuKa radiation (40 kV, 200 mA), over a 2θ range of 20°-80°, with a step size of 0.02° and a scanning speed of 5°/min.

Energy dispersive spectrometry (EDS) was performed with an Hitachi S-2400 Scanning Electron Microscope (San Jose, Calif.). The maximum operating voltage used was 25 kV.

Biodiesel Reactions and Product Analysis.

Erlenmeyer flasks (25 mL) containing oil, methanol, and catalysts were used as batch reactors. In most studies, about 10.0 g of soybean oil, about 7.6 g of methanol, and about 0.5 g of respective activated oxide catalyst were put into a flask. Flasks containing the reactant mixture were heated in a shaking bath (Series 25 incubator, New Brunswick Scientific Co.) maintained at about 58° C. and shaken with a speed of 450 rpm.

The tube reactor has a dimension of 20 mm i.d.×355 mm length in which 8 g of Ca3La1 catalyst was packed. Reactants were premixed in a beaker and then pumped into the top of the vertically oriented reactor. The flow rate was fixed at about 0.2 mL/min (Chrom. Tech. Inc., Apple Valley, Minn.). The reaction temperature was held at about 58° C. in a water bath (PolyScience Inc., Warrington, PN). The reaction pressure was around 1 atm. The resident time was about 120 minutes. The molar ratio of methanol to oil varied from about 15:1.

The concentrations of FAME in the samples were quantified by using a GC-MS (Clarus 500 GCMS, Perkin-Elmer) with a capillary column (Rtx-WAX Cat. No. 12426). Ethyl arachidate (Nu-Chek Prep Inc, Elysian, Minn.) was used as an internal standard. Water content was analyzed using a Brinkman/Metrohm 831 KF Coulometer (Westbury, N.Y.) according to ASTM D 6304-00. FFA concentration was determined using a Brinkman/Metrohm 809 titrando (Westbury, N.Y.) according to ASTM D 664.

While the invention has been described with reference to certain embodiments, other features may be included without departing from the spirit and scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A heterogeneous catalyst, consisting essentially of:
    calcium oxide, lanthanum oxide, calcium hydroxide, and lanthanum hydroxide,
    wherein the catalyst has a specific surface area of more than about 20 $m^2$/g.

2. The heterogeneous catalyst of claim 1, wherein the catalyst has a specific surface area of about 62.6 m²/g.

3. The heterogeneous catalyst of claim 1, wherein the calcium hydroxide and lanthanum hydroxide comprise segregated calcium hydroxide and lanthanum hydroxide crystals, respectively.

4. The heterogeneous catalyst of claim 1, wherein the molar ratio of calcium to lanthanum is from about 100:1 to about 1:100.

5. The heterogeneous catalyst of claim 4, wherein the molar ratio of calcium to lanthanum is from about 9:1 to about 1:3.

6. The heterogeneous catalyst of claim 5, wherein the molar ratio of calcium to lanthanum is about 3:1.

7. A process for producing a biofuel, comprising:
    contacting a feed material that comprises a glyceride with an alcohol in the presence of the catalyst of any of claim 1-2, 3, or 4-6 such that at least some of the glyceride in the feed material is converted into the corresponding alcoholic ester of the glyceride.

8. A process for producing a biofuel, comprising:
    contacting a feed material that comprises a glyceride and at least one free fatty acid with an alcohol in the presence of the catalyst of any of claim 1-2, 3, or 4-6 such that at least some of both the glyceride and the at least one free fatty acid in the feed material are converted into the corresponding alcoholic esters of the glyceride and the free fatty acid, respectively.

9. The heterogeneous catalyst of claim 1, wherein the catalyst has a total basicity of about 13.6 mmol/g.

10. The heterogeneous catalyst of claim 1, wherein the catalyst has a specific surface area of more than about 30 m²/g.

* * * * *

UNITED STATES PATENT AND TRADEMARK OFFICE
CERTIFICATE OF CORRECTION

PATENT NO. : 9,089,833 B2  
APPLICATION NO. : 13/127614  
DATED : July 28, 2015  
INVENTOR(S) : K. Y. Simon Ng et al.

Page 1 of 1

It is certified that error appears in the above-identified patent and that said Letters Patent is hereby corrected as shown below:

In the Claims

In column 15, claim 7, line 17, after "catalyst of any of" replace "claim" with --claims--.

In column 16, claim 7, line 1, before "such that at least" replace "1-2, 3, or 4-6" with --1-2, 4, or 6-8--.

In column 16, claim 8, line 7, after "catalyst of any of" replace "claim 1-2, 3, or 4-6" with --claims 1-2, 4, or 6-8--.

Signed and Sealed this  
Fifth Day of April, 2016

Michelle K. Lee  
*Director of the United States Patent and Trademark Office*